No. 723,294. PATENTED MAR. 24, 1903.
I. McCOLLISTER.
ONION SEEDER.
APPLICATION FILED SEPT. 14, 1901.
NO MODEL. 2 SHEETS—SHEET 1.

Witnesses
W. C. Sayrs
Elsie Haynes

Inventor
Irvin McCollister
By Attorney
Jos. T. Doan

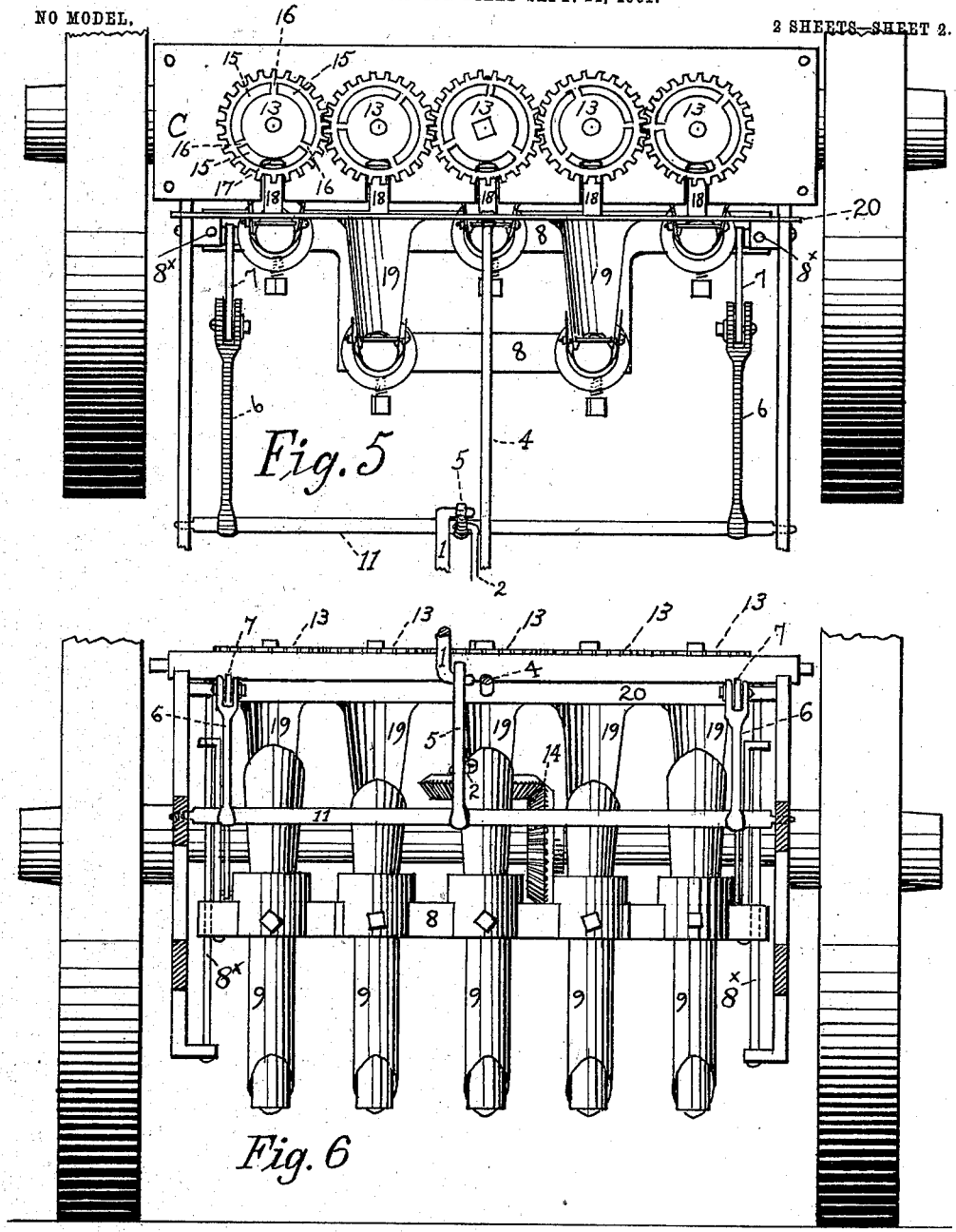

UNITED STATES PATENT OFFICE.

IRVIN McCOLLISTER, OF WILMINGTON, OHIO.

ONION-SEEDER.

SPECIFICATION forming part of Letters Patent No. 723,294, dated March 24, 1903.

Application filed September 14, 1901. Serial No. 75,383. (No model.)

*To all whom it may concern:*

Be it known that I, IRVIN McCOLLISTER, a citizen of the United States, residing at Wilmington, in the county of Clinton and State of Ohio, have invented a new and useful Garden Implement—viz., an Onion-Seeder—of which the following is a specification.

The features of novelty of my invention will be described hereinafter and particularly pointed out in the claims.

Figure 1:
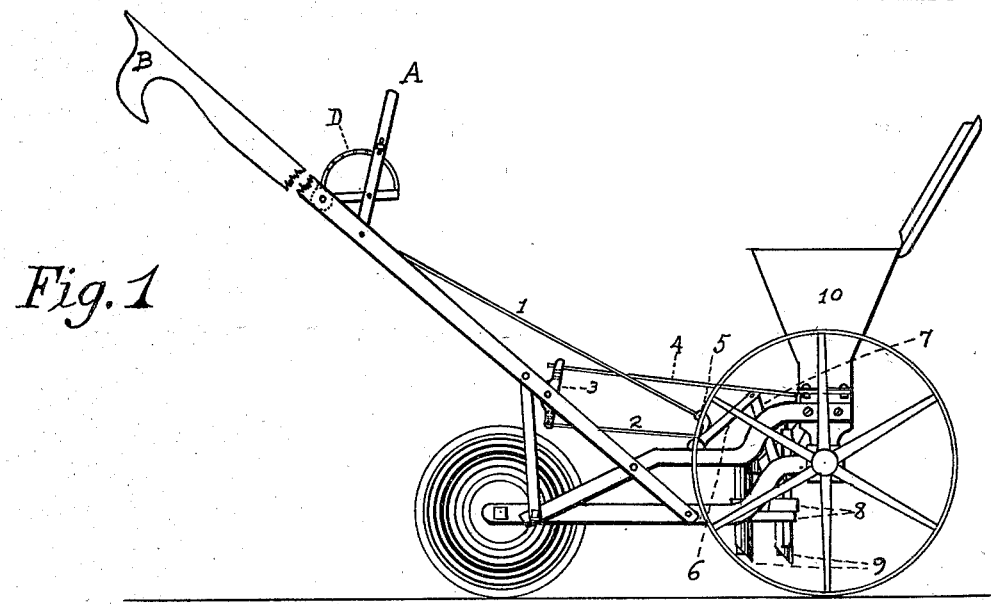
Figure 2:
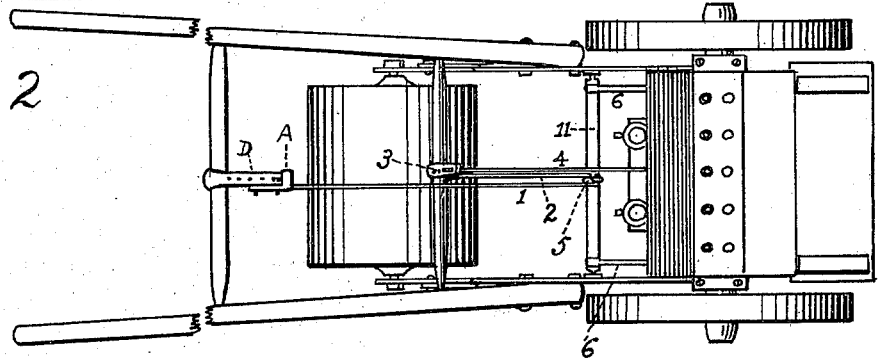
Figure 4:
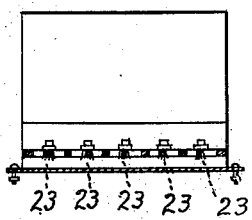
Figure 3:
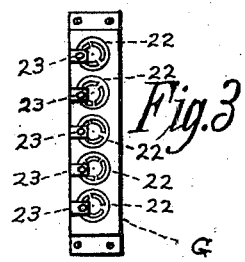

In the accompanying drawings, Figure 1 is a side view of the seeder. Fig. 2 is a plan view; Fig. 3, a detail plan view of the feed devices; Fig. 4, a sectional view of the box forming the lower portion of the hopper. Fig. 5 is a detail plan view of part of the machine with the hopper removed, and Fig. 6 is a front view of Fig. 5.

The machine comprises a hopper 10 for the seed, supported on a suitable frame having carrying-wheels, as shown, and provided with handles B, by which the machine may be moved.

G, Fig. 3, represents the lower plate or bottom of the hopper, provided with segmental openings 22 for the passage of the seed.

Immediately below the bottom of the hopper is located a series of feed-wheels 13 in the form of a train of gear-wheels in mesh and operated from the axle of the machine through bevel gear-wheels 14, connected with and driving the center wheel 13 of the series. These feed-wheels have segmental slots 15, separated by ribs 16. The slots receive the seed from the hopper through the segmental openings 22 when in register therewith, and as the wheels rotate the arms 16 push the seed to the openings 17, through which the seed then falls through the spouts 19 to the ground. These spouts are open on the side facing the operator, so that the feed of the seed may be easily seen. The openings 17 are controlled by a series of slides 18, attached to a cross-bar 20, by which all the slides may be moved in unison to increase or decrease the size of the openings 17. The cross-bar 20 is operated by a rod 4, connected therewith and with a lever 3, pivoted intermediate of its length to the frame, the lower end of said lever being connected to a rod 2, which is pivoted to an arm 5, carried by a rock-shaft 11. The arm 5 is connected at its upper end with a rod 1, which is in turn connected with a lever A, held in any desired position by a segment D. By operating the lever A the rod 1 will be pushed or pulled, and thus through the arm 5, the rod 2, the lever 3, and rod 4 the cross-bar 20 will be operated to move all the slides 18, and thus regulate the size of the openings 17, through which the seed must pass before reaching the spouts 19. The amount of movement imparted to the rod 4, and consequently the controlling slides 18 for a given movement of the lever A, may be changed by adjusting the rods 2 and 4 in relation to the center of the lever 3, for which purpose each end of the lever 3 is provided with a series of holes and each rod may be adjusted into any one of the holes of the corresponding series.

The chutes 19 discharge into the drills or hoes 9, carried by a hoe-carriage 8. Said carriage is adapted to slide vertically on guide-rods $8^\times$, secured to the frame of the machine. The carriage has pivoted thereto the lower ends of links 7, which at their upper ends are pivoted to arms 6, secured to the rock-shaft 11. When now this rock-shaft 11 is turned to withdraw the slides 18 to start the feed, the said arms 6 are swung down and through the link 7 the drill-carriage 8 is depressed and the drills 9 are thrust into the ground. The depth to which the drills penetrate may of course be determined by operating the lever A.

Referring again to the plate G, it will be seen that it is provided with a series of brushes 23, arranged to project down through the openings 22 immediately over the discharge-openings 17. When the implement is at rest, these brushes prevent the seed from passing through the holes 17 and being wasted. No seed excepting that contained in the slots 16 can reach and drop through the discharge-openings 17, and these brushes also serve to keep the slots 15 clean.

What I claim as my invention, and desire to secure by Letters Patent, is—

1. In combination, a series of spouts, a series of gear-wheels having segmental openings and ribs 16 controlling the inlets to the said spouts, a hopper above the series of gear-wheels, a series of slides 18 controlling the size of the openings leading to the spouts, means for driving the gear-wheels and means for operating the slides in unison to vary the size of the several inlet-openings, said means comprising the cross-bar 20 to which the slides are connected to be moved in unison, and means for operating the cross-bar, substantially as described.

2. In combination, a hoe-carriage 8, a hopper, a series of spouts 19 leading from the hopper, a series of slides 18 controlling the size of the inlet-openings to the said spouts, a cross-bar 20 to which the slides are connected, a lever 3 pivoted to the frame, a rod connecting one end of said lever to the cross-bar 20 for controlling the amount of feed, a rock-shaft 11 supported in the frame, an arm 5 thereon, a connection between said arm and the other end of the lever 3, the arm 6 and link 7, connecting the shaft 11 with the hoe-carriage and means connecting with the arm 5 for operating the same, substantially as described.

In testimony whereof I have signed my name to this specification in the presence of two subscribing witnesses.

IRVIN McCOLLISTER.

Witnesses:
JOE T. DOAN,
I. T. CARTWRIGHT.